(12) United States Patent
Fujita

(10) Patent No.: US 6,761,552 B2
(45) Date of Patent: Jul. 13, 2004

(54) INJECTION MOLDING MACHINE HAVING A DETECTOR WHERE A STORAGE MEDIUM IS INSTALLED

(75) Inventor: Kenji Fujita, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/339,553

(22) Filed: Jan. 10, 2003

(65) Prior Publication Data

US 2003/0110009 A1 Jun. 12, 2003

Related U.S. Application Data

(63) Continuation of application No. PCT/JP02/05019, filed on May 23, 2002.

(30) Foreign Application Priority Data

May 24, 2001 (JP) .................................. 2001-155729
Mar. 6, 2002 (JP) .................................. 2002-060053

(51) Int. Cl.[7] .......................... B29C 45/77; B29C 45/78
(52) U.S. Cl. ................................. 425/145; 425/149
(58) Field of Search ............................. 425/145, 149, 425/150, 140

(56) References Cited

U.S. PATENT DOCUMENTS 4,692,107 A * 9/1987 Morikawa et al. .......... 425/140
5,032,525 A * 7/1991 Lee et al. .................. 425/149
5,687,103 A   11/1997 Hagl et al.
6,190,585 B1 * 2/2001 Brown et al. ............... 425/145
6,343,920 B1   2/2002 Terasaki et al.
6,440,338 B1 * 8/2002 Kamiguchi et al. ......... 425/145
6,616,871 B1 * 9/2003 Iimura et al. ............... 425/145

FOREIGN PATENT DOCUMENTS

| JP | 02133160    | 5/1990 |
| JP | 05185451    | 7/1993 |
| JP | 06015701    | 1/1994 |
| JP | 2001053357  | 2/2001 |
| JP | 2001105465  | 4/2001 |

\* cited by examiner

*Primary Examiner*—Tim Heitbrink
(74) *Attorney, Agent, or Firm*—Squire, Sanders & Dempsey L.L.P.

(57) ABSTRACT

An injection molding machine includes a driving part, a driven part driven by the driving part, and a detector detecting a driven state of the driven part, wherein a storage medium is installed in the detector. Detector information to distinguish the detector, original point position information of the driving part, or molding machine information to distinguish the injection molding machine is stored in the storage medium. This information is compared with information stored in the controller of the injection molding machine.

20 Claims, 10 Drawing Sheets

FIG.4

WHEN INJECTION MOLDING MACHINE IS ASSEMBLED NEWLY

| ROTATION DETECTOR | | CONTROLLER | |
|---|---|---|---|
| DATA STORED IN THE MEMORY OF DETECTOR | | DATA STORED IN THE MEMORY OF CONTROLLER | |
| DETECTOR INFORMATION | MODEL SERIAL No. VERSION No. | DETECTOR INFORMATION | NONE |
| MOTOR ORIGINAL POINT POSITION | NONE | MOTOR ORIGINAL POINT POSITION | NONE |
| MOLDING MACHINE INFORMATION | NONE | MOLDING MACHINE INFORMATION | SERIAL No. DRIVING APPARATUS PLASTICIZING CAPACITY MOLD CLAMPING FORCE |

FIG.5

WHEN DETECTOR IS EXCHANGED

| ROTATION DETECTOR | | CONTROLLER | |
|---|---|---|---|
| DATA STORED IN THE MEMORY OF DETECTOR | | DATA STORED IN THE MEMORY OF CONTROLLER | |
| DETECTOR INFORMATION | MODEL SERIAL No. VERSION No. | DETECTOR INFORMATION | DATA WHEN PREVIOUS DETECTOR WAS USED |
| MOTOR ORIGINAL POINT POSITION | NONE | MOTOR ORIGINAL POINT POSITION | DATA WHEN PREVIOUS DETECTOR WAS USED |
| MOLDING MACHINE INFORMATION | NONE | MOLDING MACHINE INFORMATION | SERIAL No. DRIVING APPARATUS PLASTICIZING CAPACITY MOLD CLAMPING FORCE |

FIG.6

WHEN CONTROLLER IS EXCHANGED

| ROTATION DETECTOR | | CONTROLLER | |
|---|---|---|---|
| DATA STORED IN THE MEMORY OF DETECTOR | | DATA STORED IN THE MEMORY OF CONTROLLER | |
| DETECTOR INFORMATION | MODEL SERIAL No. VERSION No. | DETECTOR INFORMATION | NONE |
| MOTOR ORIGINAL POINT POSITION | ORIGINAL POINT POSITION | MOTOR ORIGINAL POINT POSITION | NONE |
| MOLDING MACHINE INFORMATION | SERIAL No. DRIVING APPARATUS PLASTICIZING CAPACITY MOLD CLAMPING FORCE | MOLDING MACHINE INFORMATION | SERIAL No. DRIVING APPARATUS PLASTICIZING CAPACITY MOLD CLAMPING FORCE |

FIG.7

WHEN NORMAL ELECTRIC POWER IS SUPPLYED

| ROTATION DETECTOR | | CONTROLLER | |
|---|---|---|---|
| DATA STORED IN THE MEMORY OF DETECTOR | | DATA STORED IN THE MEMORY OF CONTROLLER | |
| DETECTOR INFORMATION | MODEL SERIAL No. VERSION No. | DETECTOR INFORMATION | MODEL SERIAL No. VERSION No. |
| MOTOR ORIGINAL POINT POSITION | ORIGINAL POINT POSITION | MOTOR ORIGINAL POINT POSITION | ORIGINAL POINT POSITION |
| MOLDING MACHINE INFORMATION | SERIAL No. DRIVING APPARATUS PLASTICIZING CAPACITY MOLD CLAMPING FORCE | MOLDING MACHINE INFORMATION | SERIAL No. DRIVING APPARATUS PLASTICIZING CAPACITY MOLD CLAMPING FORCE |

INJECTION MOLDING MACHINE HAVING A DETECTOR WHERE A STORAGE MEDIUM IS INSTALLED

This is a Continuation of International Application No. PCT/JP02/05019 filed May 23, 2002, which designated the U.S. and was published under PCT Article 21(2) in English.

TECHNICAL FIELD

The present invention generally relates to injection molding machines, and more particularly, to an injection molding machine having a detector where a storage medium is installed.

BACKGROUND ART

In an injection molding machine, resin heated and melted in a heating cylinder is injected into a cavity of a mold apparatus under high pressure so that the cavity is filled with the molten resin. The molten resin is then cooled and solidified so as to obtain a molded article.

Because of this, a plurality of driving parts and driven parts are provided in the injection molding machine. In addition, detectors are provided for the driving parts and driven parts so as to detect a driven state of the driven parts such as speed or positions of the driven parts.

For example, in an electric injection molding machine, a plurality of motors such as a servo motor for injection, a servo motor for screw rotating, a servo motor for mold clamping, and others, are provided as the driving parts. Furthermore, a screw, a cross head and others are provided as the driven parts. Rotation detectors, such as rotary encoders, are provided for output shafts of these servo motors. For example, the rotation detector recognizes a number of rotations and an amount of rotation of the servo motor and outputs a detection signal representing the recognized number of rotations and the recognized amount of rotation of the servo motor. The detection signal is used as a signal for detecting the speed and the position of the driven part that is driven by the output shaft of the servo motor. In a case where speed control for the driven part is implemented, the controller receives the driven signal from the rotation detector. The controller controls the number of rotations and the amount of rotation of the servo motor based on the speed represented by the detection signal. That is, the controller controls the number of rotations and the amount of rotation of the servo motor so as to make the driven part have a designated speed.

FIG. 1 is a block diagram schematically showing a feed back control system of a servo motor of a conventional electric injection molding machine. This block diagram shows minimum structural elements in order to simplify the explanation of the feed back control system. However, an actual feed back control system has a more complex structure than the block diagram.

Referring to FIG. 1, a rotation detector 22 is provided at an output shaft 25 of a servo motor 21. A detection signal from the rotation detector 22 is input to a controller 20 through an interface circuit 23. The detection signal from the rotation detector 22 is converted to a signal suitable for a digital process at the controller 20 by the interface circuit 23. The controller 20 controls the number of the rotations and the amount of the rotation of the servo motor 21, based on information with regard to the number of the rotations and the amount of the rotation of the servo motor 21 that is detected by the rotation detector 22.

Meanwhile, in a case where the rotation detector 22 is provided at the output shaft 25 of the servo motor 21, it is necessary to measure an original point of the servo motor 21 and store the original point as original point position information. This is because it is necessary to recognize the number of the rotations and the amount of the rotation of the servo motor 21 by using the original point as a standard so as to control the number of the rotations and the amount of the rotation of the servo motor 21.

Furthermore, detector information, in addition to the original point position information of the servo motor 21, is stored in order to distinguish the rotation detector 22. The detector information is defined as individual information to distinguish the rotation detector uniquely. Information represented by a numerical value or a character such as from the alphabet, for example "a model of the rotation detector", "a serial number", "a version number" or the like, is applicable to the detector information. The injection molding machine has one controller 20. Generally, the controller 20 controls a plurality of the servo motors of the injection molding machine in parallel. Hence, a plurality of the detection signals are input from the rotation detector to the controller 20. In this case, it is necessary to distinguish from which rotation detector the detection signal is input. In addition, it is necessary to distinguish whether or not the input detection signal is from a proper rotation detector.

Thus, in the conventional electric injection molding machine, the original point position information of the servo motor 21 is combined with the detector information regarding the rotation detector 22 provided at the output shaft 25 of the servo motor 21, and stored in a memory 26 installed in the controller 20 after the rotation detector 22 is provided for the servo motor 21. In a case where a memory is installed in the interface circuit 23, the original point position information of the servo motor 21 and the detector information are stored in the memory.

However, in the above mentioned conventional injection molding machine, it is necessary to implement an operation for detection of the original point position of the injection molding machine and store the original point position information of the servo motor 21 and the detector information of the rotation detector 22 in the memory 26, again, whenever the rotation detector 22 is exchanged. In this case, for example, if a setting operation to input the information of the original point position after the rotation detector is exchanged is missed or if the injection molding machine where an improper rotation detector is provided at the servo motor 21 in error is operated, the injection molding machine works incorrectly.

Furthermore, in the above mentioned conventional injection molding machine, the original point position information of the servo motor 21 and the detector information of the rotation detector 22 has to be stored, whenever the interface circuit 23 having the original point position information and the detector information or the controller 20 is exchanged, or the rotation detector 22 and the interface circuit 23 having the original point position information and the detector information or the controller 20 are exchanged. Hence, operation for exchanging the interface circuit 23, the controller 20, or the servo motor 21 is complicated. As a result of this, human support for maintenance is required inconveniently, whenever the interface circuit 23, the controller 20, or the servo motor 21 is exchanged.

DISCLOSURE OF INVENTION

Accordingly, it is a general object of the present invention is to provide a novel and useful injection molding machine having a detector where a storage medium is installed.

Another and more specific object of the present invention is to provide an injection molding machine, including a driving part, a driven part driven by the driving part, and a detector detecting a driven state of the driven part, wherein a storage medium is installed in the detector.

The storage medium may be a one chip microcomputer. The one chip microcomputer is suitable as the recording medium since the one chip microcomputer has a memory and is distributed at a low price.

Detector information or molding machine information to distinguish the detector may be stored in the storage medium. The detector information may include the model of the detector, a serial number, or a version number, of the detector. The molding machine information may include information with regard to a serial number of the injection molding machine and a driving apparatus. The molding machine information may further include information with regard to a plasticizing capacity or mold clamping force. The driving part may be a motor. The detector may be provided at an output shaft of the motor. The driving part may be operated by supplying hydraulic pressure. The injection molding machine may further include a driving transmission part for transmitting motive force by the driving part to the driven part, wherein the detector is provided at the driving transmission part. The detector may be provided at the driving part or the driven part. The detector may detect a rotation, a position or a speed of the driven part.

It is another object of the present invention is to provide an injection molding machine, including a driving part, a driven part driven by the driving part, a detector detecting a driven state of the driven part and outputting a detection signal, and a controller receiving the detection signal so as to control motive force by the driving part, wherein a storage medium is installed in the detector, a memory is stored in the controller, and common information is stored in the storage medium and the memory.

Since common information is stored in the storage medium and the memory of the controller, in a case where the detector is exchanged, an interface circuit or the controller is exchanged, or the detector and the interface circuit or the controller is exchanged, it is possible to compare and rewrite the common information. Accordingly, it is possible to easily exchange the detector, the interface circuit or the controller, so that an operator himself can exchange them easily so as to prevent the injection molding machine from working incorrectly. That is, the maintenance of the injection molding machine is easy so that the injection molding machine restarts working easily after the exchanging process is finished.

For example, the original point position information of the driving part and the molding machine information to distinguish the injection molding machine may be stored in the storage medium of the detector where the detector information to distinguish the detector has already been stored, and the original point position information of the driving part and the detector information to distinguish the detector may be stored in the memory of the controller where the molding machine information has already been stored.

According to the above mentioned invention, it is possible to store the same detector information and the same original point position information in the controller and compare the detector information and the original point position information. Hence, it is possible to prevent the injection molding machine from working incorrectly due to missing a setting operation after the rotation detector is exchanged.

Furthermore, since the molding machine information, in addition to the detector information and the original point position information, is stored in the recording medium and the controller, it is possible the positively distinguish between a case where only the controller is exchanged and a case where both the rotation detector and the controller are exchanged.

The controller may compare detector information stored in the storage medium and a detector information stored in the memory so as to report the detector information stored in the storage medium is different from the detector information stored in the memory. Furthermore, the controller may compare original point position information stored in the storage medium and original point position information stored in the memory so as to report the original point position information stored in the storage medium is different from the original point position information stored in the memory.

Based on the report of that the original point position information stored in the storage medium is different from the original point position information stored in the memory, a correct setting operation is prompted for before the injection molding machine is driven. Because of this, working the injection molding machine incorrectly due to missing a setting operation after the detector is exchanged, is prevented.

The controller compares molding machine information stored in the storage medium and molding machine information stored in the memory so as to report the molding machine information stored in the storage medium is different from the molding machine information stored in the memory.

Based on the report of that the molding machine information stored in the storage medium is different from the molding machine information stored in the memory, it is possible to determine a case where the rotation detector and the controller are exchanged simultaneously. In a case where only the controller is exchanged, the controller can read the original point position information stored in the storage medium. Hence, it is not necessary to detect the original point position and implement a setting operation again.

BRIEF DESCRIPTION OF DRAWINGS

FIG. 4 is a view explaining contents of information stored in a memory of a one chip microcomputer and information stored in a memory in the controller, in a case where the injection molding machine is newly assembled;

FIG. 5 is a view explaining contents of information stored in the memory of the one chip microcomputer and information stored in the memory in the controller, in a case where the rotation detector 62 shown in FIG. 3 is exchanged;

FIG. 6 is a view explaining contents of information stored in the memory of the one chip microcomputer and information stored in the memory in the controller, in a case where the controller 34 shown in FIG. 3 is exchanged;

FIG. 7 a view explaining contents of information stored in the memory of the one chip microcomputer and information stored in the memory in the controller when normal electric power is supplied to the injection molding machine of the first embodiment of the present invention shown in FIG. 2;

BEST MODE FOR CARRYING OUT THE INVENTION

A description will now be given, with reference to the FIGS. 2 through 12, of embodiments of the present invention.

Figure 1:
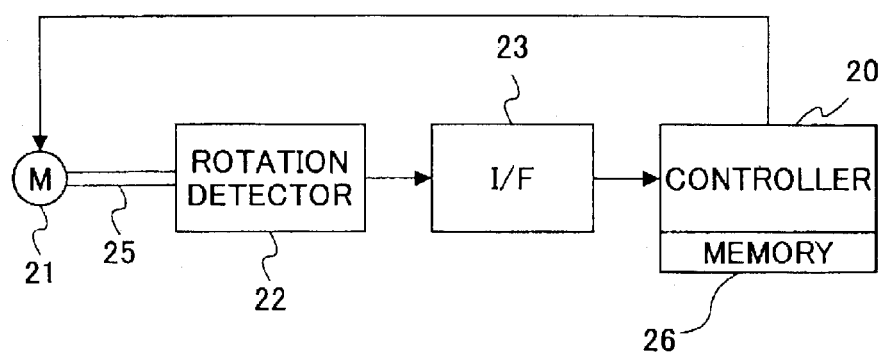
FIG. 1 is a block diagram schematically showing a feed back control system of a servo motor of a conventional electric injection molding machine.
Figure 2:
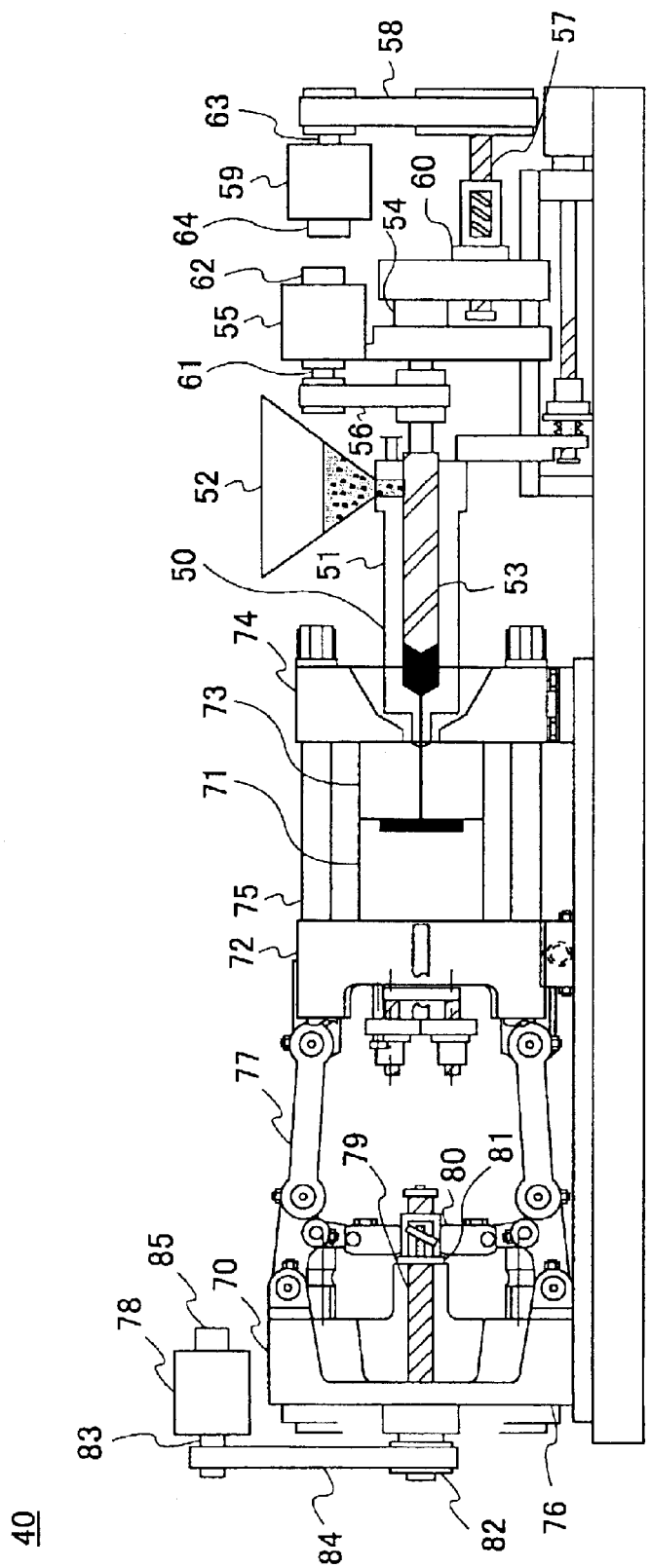
FIG. 2 is a cross sectional view showing a schematic structure of an injection molding machine 40 of a first embodiment of the present invention.

FIG. 2 is a cross sectional view showing a schematic structure of an injection molding machine of a first embodiment of the present invention. Referring to FIG. 2, an electric injection molding machine 40 includes an injection apparatus 50 and a mold clamping apparatus 70.

The injection apparatus 50 includes a heating cylinder 51. A hopper 52 is disposed on the heating cylinder 51. A screw 53 is disposed inside the heating cylinder 51 so that the screw 53 can be rotated about an axis and can be advanced and retracted. A rear end part of the screw 53 is supported by a support member 54 so that the screw 53 can be rotated. A metering motor 55 such as a servo motor is equipped at the support member 54 as a driving part. A rotation of the metering motor 55 is transmitted to the screw 53 as a driven part by a timing belt 56 equipped at an output shaft 61 of the metering motor 55. A rotation detector 62 is directly connected with a rear end part of the output shaft 61 of the metering motor 55. The rotation detector 62 recognizes a number of rotations and an amount of rotation of the metering motor 55 so as to detect a rotational speed of the screw 53, representing a driven state of the screw 53.

The injection apparatus 50 also includes a screw shaft 57 provided parallel to the screw 53 so that the screw shaft 57 can be rotated. An end part of the screw shaft 57 is connected to an injection motor 59 by a timing belt 58 equipped at an output shaft 63 of the injection motor 59 such as a servo motor. Hence, the screw shaft 57 is rotated by the injection motor 59. A nut 60 fixed to the support member 54 is slidably and matably engaged with a front end part of the screw shaft 57. Accordingly, the injection motor 59 is driven as a driving part in order to rotate the screw shaft 57 by the timing belt 58, so that the support member 54 can be advanced or retracted. As a result of this, the screw 53 as a driven part can be advanced or retracted. A position detector 64 is directly connected with a rear end part of the output shaft 63 of the injection motor 59. The position detector 64 recognizes a number of rotations and an amount of rotation of the injection motor 59 so as to detect the position of the screw 53, representing a driven state of the screw 53.

The mold clamping apparatus 70 includes a movable platen 72 where a movable mold 71 is attached and a stationary platen 74 where a stationary mold 73 is attached. The movable platen 72 is connected to the stationary platen 74 by tie bars 75. The movable platen 72 can slide along the tie bars 75. The mold clamping apparatus 70 also includes a toggle mechanism 77. One end part of the toggle mechanism 77 is connected to the movable platen 72 and the other end of the toggle mechanism 77 is connected to a toggle support 76. A ball screw shaft 79 is supported at the center of the toggle support 76 so as to be capable of rotating. A nut 81, provided at a cross head 80 that is disposed at the toggle mechanism 77, is slidably and matably engaged with the ball screw shaft 79. A pulley 82 is provided at a read end part of the ball screw shaft 79. A timing belt 84 is stretched and provided between the pulley 82 and an output shaft 83 of a mold clamping motor 78 such as a servo motor.

Accordingly, in the mold clamping apparatus 70, when the mold clamping motor 78 is driven as a driving part, rotation of the mold clamping motor 78 is transmitted to the ball screw shaft 79 as a driving transmission part by the timing belt 84. Furthermore, a motion direction is converted from a rotational motion to a rectilinear motion by the ball screw shaft 79 and the nut 81 so that the toggle mechanism 77 is acted upon. Based on the toggle mechanism 77 being acted on, the movable platen 72 slides along the tie bars 75 so that the movable mold 72 is closed to, clamped to or opened from the stationary mold 74. A position detector 85 is directly connected with a rear end part of the output shaft 83 of the mold clamping motor 78. The position detector 85 recognizes a number of rotations and an amount of rotation of the mold clamping motor 78 so as to detect a position of the cross head 80 that is advanced or retracted based on the rotation of the ball screw shaft 79 or a position of the movable platen 72 as a driven part that is connected to the cross head 80 by the toggle mechanism 77.

Figure 3:
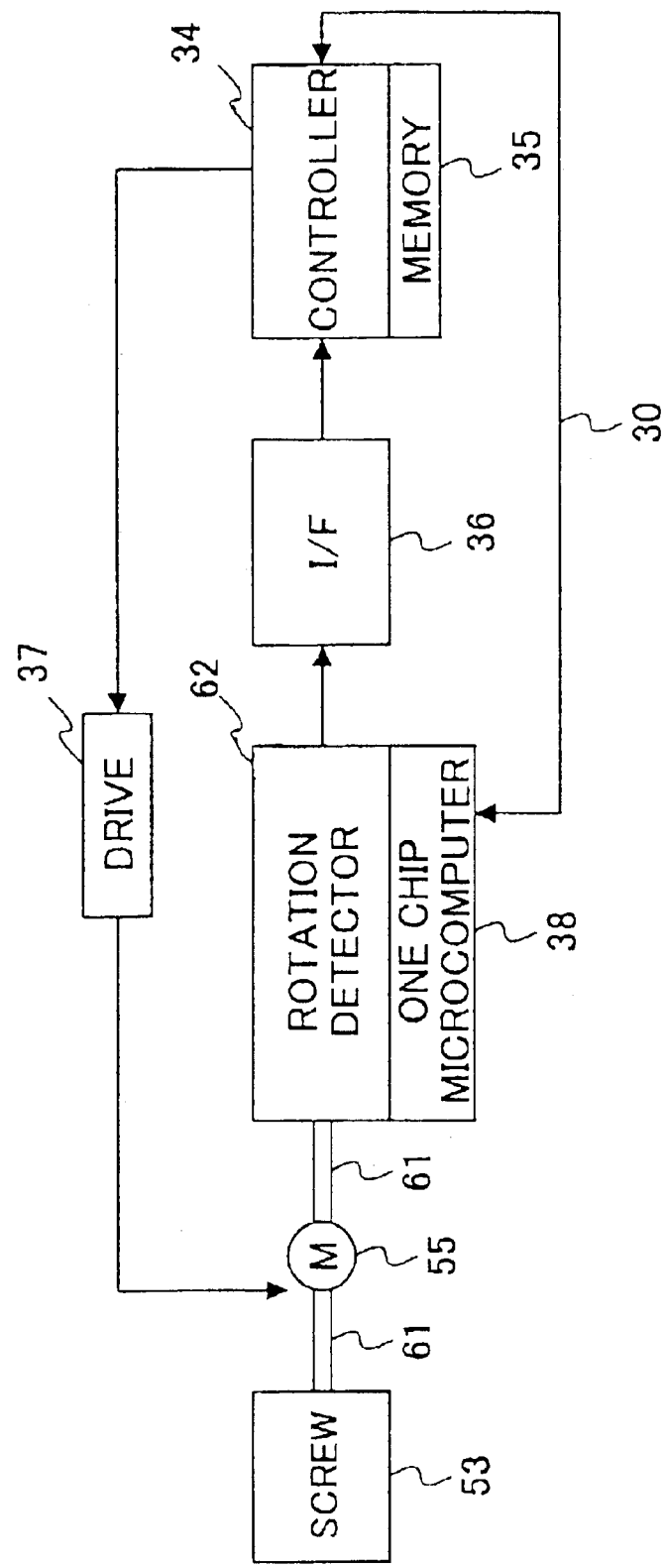
FIG. 3 is a block diagram schematically showing a feed back control system of a metering servo motor 55 of the injection molding machine 40 shown in FIG. 2 of the first embodiment of the present invention.

FIG. 3 is a block diagram schematically showing a feed back control system of a metering servo motor 55 of the injection molding machine 40 shown in FIG. 2 of the first embodiment of the present invention. This block diagram shows minimum structural elements in order to simplify the explanation of the feed back control system of this embodiment. However, an actual feed back control system has a more complex structure than the block diagram.

Referring to FIG. 3, as described above with FIG. 2, in this embodiment, the metering motor 55 as the driving part drives the screw 53 as the driven part. The rotation detector 62 is provided at the output shaft 61 of the metering motor 55. The rotation detector 62 recognizes the number or amount of rotation of the metering motor 55 so as to detect the rotational speed of the screw 53. There are various types of rotation detectors but a rotary encoder can be applied to the rotation detector 62.

The detection signal from the rotation detector 62 is input to the controller 34 through the interface circuit 36. The controller 34 controls the number or amount of rotation of the metering motor 55 through a drive 37, based on the information of the number or amount of rotation of the metering motor 55 that is recognized by the rotation detector 62.

The one chip microcomputer 38 is installed in the rotation detector 62 as a storage medium. The original point position information of the metering motor 55 and the detector information of the rotation detector 62 are stored in the one chip micro computer 38. The one chip microcomputer 38 is suitable as the recording medium since the one chip microcomputer has a memory and is distributed at a low price.

In order to control the number or amount of rotation of the metering motor 55, it is necessary to detect the number and the amount of the rotation by using the original point as a standard so as to control the number and the amount of the rotation of the metering motor 55. Because of this, the original point position information is required. Therefore, it is possible to prevent incorrectly working the screw 53 driven by the metering motor 55, by storing the original point position information correctly.

Furthermore, in this embodiment, "model of the rotation detector" and "serial number/version number" are used as detector information.

It is possible to grasp whether or not correct model rotation detectors are provided at the respective driving parts of injection, metering, mold clamping, ejector and others, based on the information of the "model of the rotation detector". In this embodiment, it is possible to grasp whether or not the correct model rotation detector is provided at the metering motor 55.

Meanwhile, even in a case of a same model of the rotation detector, if the detection method is changed, for example, it may be necessary to modify software in the controller. In addition, when the rotation detector is exchanged, which version of the rotation detector is provided is sometimes unclear. That is, it is necessary to ensure the use of software of the controller that is proper for the version of the rotation detector at the same time when the rotation detector is exchanged. Hence, in a case where any version of the detector is provided, the controller determines the version of the detector so as to use the proper software automatically, by storing the "serial number/version number".

It is noted that not only "model of the rotation detector" or "serial number/version number" but also any information can be used as long as it is possible to distinguish the individual rotation detectors.

In this embodiment, the one chip microcomputer 38 is installed in the rotation detector 62 in advance. In addition, the detector information is stored in the memory of the one chip microcomputer 38.

In this embodiment, the molding machine information can be stored in the memory of the one chip microcomputer 38. The molding machine information is information to distinguish the injection molding machine. It is ordinal that not only one but also a plurality of the injection molding machines are equipped in a factory. In this case, it is desirable to observe the plurality of the injection molding machines in a group. Based on the molding machine information, it is possible to observe in a group and distinguish each of the plurality of the injection molding machines.

"Serial number of the injection molding machine" numbered for every injection molding machine, information of the "driving apparatus" in the injection molding machine where the detector is used, information regarding "plasticizing capacity and mold clamping force", or the like is used.

"Serial number of the injection molding machine" is a unique number for each of molding machine. Since there is no duplicate serial number of the injection molding machine, it is possible to positively distinguish each molding machine. "Serial number of the injection molding machine" may include a series name of the injection molding machine.

Based on the information of the "driving apparatus" being used, in a case where a plurality of same model detectors are used for one injection molding machine, it is possible to determine whether or not each of the same model detectors is exchanged. The information of the "driving apparatus" is input by marking like IJ(injection), MD(mold clamping), EJ(ejector), RO(metering) or the like.

Furthermore, due to an undesirable accident, data in the controller 34 and the detector 62 may change to abnormal data. Hence, in a case where data in the memory 35 of the controller 34 and data in the one chip microcomputer 38 of the detector 62 are compared, many kinds of data can be compared by storing information except "serial number of the injection molding machine" and "driving apparatus" to being used, like. "plasticizing capacity, mold clamping force", as the molding machine information. As a result of this, it is possible to improve accuracy of the data.

However, as long as individual injection molding machines can be distinguished, not only the above mentioned information but also any kind of information may be used.

In a case where the rotation detector 62 having the above mentioned one chip microcomputer 38 is provided at the output shaft of the metering motor 55, the original point position of the metering motor 55 is measured and stored in the memory in the one chip micro computer 38 with the detector information and the molding information. It is possible to store the data in the memory in the one chip microcomputer 38 by well known art. In this embodiment, it is possible to store the data in the memory in the one chip microcomputer 38 by the controller 34. That is, the controller 34 is connected to a data input apparatus such as a display, a keyboard and the like. Necessary information is input by the data input apparatus so as to be stored in the memory of the one chip microcomputer 38 by the data input apparatus, via the controller 34. Because of this, the controller 34 is connected to the one chip microcomputer 38 by an exclusive line 30. The controller 34 not only inputs data to the one chip microcomputer 38 via the exclusive line 30 but also reads out data from the one chip microcomputer 38.

Furthermore, in this embodiment, the above mentioned original point position information, the detector information of the rotation detector 62, and the molding information are stored in the memory 37 of the controller 34, too. This is because, as described later, the original point position information, the detector information of the rotation detector 62, and the molding information stored in the one chip microcomputer 38 are compared with the original point position information, the detector information of the rotation detector 62, and the molding information stored in the memory 35 of the controller 34, respectively, by the controller 34. Whenever the electric power is supplied to the injection molding machine by the controller 34, the above mentioned comparison is implemented. If there is an inconsistency between them, the inconsistency is reported by an alarm and contents of the inconsistency are displayed in a display.

Here, the molding machine information is already stored in the memory 35 of the controller 34 during a manufacturing process of the injection molding machine.

Because of this, in a case where the rotation detector 62, the interface circuit 36, or the controller 34 is exchanged, it is not necessary to store the original point position information of the metering motor 53 and the detector information of the rotation detector 62 again.

Next, referring to FIGS. 4 through 7, a storing method of the above mentioned information for corresponding to various cases will be described.

FIG. 4 is a view explaining contents of information stored in a memory of a one chip microcomputer and information stored in a memory in the controller, in a case where the injection molding machine is newly assembled. Only the detector information is stored in the memory of the one chip microcomputer 38 provided at the rotation detector 62. On the other hand, only the molding machine information is stored in the memory 35 in the controller 34.

After the electric injection molding machine 40 is equipped, the electric power is supplied to the electric injection molding machine 40. In this case, the controller 34 reads out the information from the memory of the one chip microcomputer 38 but only the detector information can be obtained. On the other hand, the molding machine information is in the memory 35 in the controller 34. In this case, the controller 34 determines that the injection molding machine is newly assembled so that the following action is implemented.

The original point position information, the detector information of the rotation detector 62, and the molding information stored in the memory of the one chip microcomputer 38 are compared with the original point position information, the detector information of the rotation detector 62, and the molding information stored in the memory 35 of the controller 34, respectively, by the controller 34. However, there is no consistency between them. In this case, the controller 34 stores the detector information read out from the memory of the one chip microcomputer 38 in the memory 35. The controller 34 also reads out the molding machine information stored in the memory 35 so as to write to the memory of the one chip microcomputer 38. Furthermore, the controller 34 outputs the alarm indicating the inconsistency of the information and displays the inconsistency of the original point position information to the display. Based on the display, an operator implements the original point position detection. The operator writes the detected original position in the memory of the one chip microcomputer 38 and the memory 35 in the controller 34 through the controller 34 by the data input apparatus.

As described above, same of the detector information, the original point position information, and the molding machine information are written in the memory of the one chip microcomputer 38 and the memory 35 of the controller 34. Hence, after that, if the controller 34 implements the above mentioned comparison, both sets of information become consistent, so that it is possible to control the injection molding machine 40.

FIG. 5 is a view explaining contents of information stored in the memory of the one chip microcomputer and information stored in the memory in the controller, in a case where the rotation detector 62 shown in FIG. 3 is exchanged. There are two cases, that is a case where a new rotation detector is provided and a case where a used rotation detector is provided. However, in any case, based on the comparison by the controller 34, a result of inconsistency of the information is obtained. A case where new rotation detector is provided will be described.

In this case, only the detector information is stored in the memory of the one chip micro computer 38 installed in the rotation detector 62. On the other hand, not only the molding machine information but also the old detector information and the original point position information of the rotation detector previously used, are stored in the memory 35 in the controller 34. The controller 34 determines the exchange of the new rotation detector 62 so as to implement the following actions.

After the rotation detector is exchanged and the electric power is supplied to the electric injection molding machine 40, the controller 34 reads out the detector information from the memory of the one chip microcomputer 34 and compares it with the detector information read out from the memory 35 in the controller 34. In this case, all of the detector information, the original point position information and the molding machine information are inconsistent.

In this case, the controller 34 deletes the old detector information stored in the memory 35, overwrites and stores the detector information read out from the memory of the one chip microcomputer 38, writes the molding machine information stored in the memory 35 to the memory of the one chip microcomputer 38.

The controller 34 also outputs the alarm indicating the inconsistency of the information so as to display the inconsistency of the information to the display. Based on this display, the operator implements the original point position detection of the metering motor 55 and writes the detected original point position information in the memory of the one chip microcomputer 38. The operator also deletes the old original point position information in the memory of the controller 34 and overwrites and stores new original point position information.

Because of this, as described above, the same of the detector information, the original point position information, and the molding machine information are written in the memory of the one chip microcomputer 38 and the memory 35 of the controller 34, respectively. Hence, after this, if the controller 34 implements the comparison action as described above, all of the information is consistent so that it is possible to control the injection molding machine 40.

In a case where not a new rotation detector but a used rotation detector is exchanged, the old original point position information and the old molding machine information of the previous injection molding machine are written in the memory of the one chip microcomputer 38 shown in FIG. 3. This is different from the above mentioned description. In this case, the controller 34 determines that the used rotation detector is exchanged. Hence, the original point position information and the molding machine information in the memory of the one chip microcomputer 38 are exchanged and the original point position information and the detector information in the memory 35 are exchanged.

FIG. 6 is a view explaining contents of information stored in the memory of the one chip microcomputer and information stored in the memory in the controller, in a case where the controller 34 shown in FIG. 3 is exchanged. In this case, the detector information, the original position information, and the molding machine information are written in the memory of the one chip microcomputer 38 provided in the rotation detector 62. This information is information unnecessary to be renewed.

On the other hand, at the time of completion of the exchange of the new controller 34, the molding machine information of the injection molding machine is written in the memory of the controller 34. This molding information is same as the molding machine information in the memory of the one chip microcomputer 38. Hence, the controller 34 determines that the controller itself is exchanged so that the controller 34 implements the following action.

After the controller 34 is exchanged and the electric power is supplied to the electric injection molding machine 40, the controller 34 reads out the information from the memory of the one chip microcomputer 38 and compares it with the information read out from the memory 35 in the controller 34. In this case, the detector information and the original point position information are not consistent and only the molding machine information is consistent.

In a case where the controller itself is exchanged, even if the all of information is not consistent, the controller 34 does not output the alarm and does not display the inconsistency. After this, the detector information and the original point position information read out from the memory of the one chip microcomputer 38 are stored in the memory 35, respectively, under recognition that all of the information stored in the memory of the one chip microcomputer 38 is correct. In this case, if the controller 34 implements the above mentioned comparison, all of the information is consistent and it is possible to implement the following control.

The reason why the molding machine information is also stored in the memory of the one chip microcomputer 38 and the memory 35 in the controller 34 is as follows. If the molding machine information is not stored in the memory of the one chip microcomputer 38 and the memory 35 in the controller 34, in a case where the rotation detector is exchanged for another used rotation detector and the controller is exchanged simultaneously, the detector information and the original point position information are stored in the memory of the one chip microcomputer 38 but neither the detector information nor the original point position information is stored in the memory 35 of the controller 34. Accordingly, if the molding machine information is not stored, it is not possible to distinguish whether only the controller is exchanged or the rotation detector and the controller are exchanged simultaneously. However, it is possible to distinguish whether only the controller is exchanged or the rotation detector and the controller are exchanged simultaneously, by the molding information, because the respective molding information is consistent if only the controller is exchanged and respective molding information is not consistent if the rotation detector and the controller are exchanged simultaneously. In a case where only the controller is exchanged, the controller 34 can read out the original point position information stored in the memory of the one chip microcomputer 35 as it is. Hence, it is not necessary to implement detection of and setting the original point position.

FIG. 7 is a view explaining contents of information stored in the memory of the one chip microcomputer and information stored in the memory in the controller when normal electric power is supplied to the injection molding machine of the first embodiment of the present invention shown in FIG. 2.

As described above, in a case where the electric power is supplied to the electric injection molding machine 40, the controller 34 compares the detector information, the original point position information, and the molding machine information stored in the memory of the one chip microcomputer 38 with the detector information, the original point position information, and the molding machine information stored in the memory 35, respectively. When the injection molding machine is in normal operation, all of the information are consistent. Therefore, it is possible to control the injection molding machine soon.

According to the present invention, as shown in FIGS. 4 and 6, in a case where the controller is exchanged, it is not necessary to store the original point position information of the metering motor 55 and the detector information of the rotation detector 62 again, unlike the conventional art. In addition, the setting operation is not necessary after the controller is exchanged. Therefore, human support for maintenance is not necessary so that the operator himself can exchange the controller without occurrence of an incorrect action of the injection molding machine during an exchange operation. That is, it is possible to simplify the maintenance of the electric injection molding machine 40 so that the electric injection molding machine 40 can start up easily after the exchange operation.

Furthermore, according to the present invention, as shown in FIGS. 4 and 5, after exchanging of the rotation detector 62 is finished, the comparison with regard to the detector information and the original point position information is invariably implemented. In a case where there is inconsistency of the information, the inconsistency is reported so as to operate to detect and input the original point position information. Hence, if the setting operation of the original point position information after the rotation detector 62 is exchanged is missed, the injection molding machine is prevented from working incorrectly before working, unlike the conventional art.

Furthermore, the same kind of rotation detector has the same model. Hence, in a case where the rotation detector provided at the driving part is exchanged, if the incorrect model of the rotation detector is provided at the driving part, that causes the injection molding machine to work incorrectly. On the other hand, according to the present invention, the model of the rotation detector is compared. In a case where there is an inconsistency between them, the inconsistency is displayed so that providing another model of the rotation detector, is prevented, too.

In this embodiment, although the metering motor 55 is described above as an example, a feed back control system that the present invention uses can be applied to the injection motor 59 and the mold clamping motor 78, too. That is, the present invention can be applied to a feed back control based on the detection of the position of the screw 53 by the position detector 64 provided at the output shaft 63 of the injection motor 59 and a feed back control based on the detection of the position of the cross head 80 advancing and retracting by the rotation of the ball screw shaft 79 or the movable platen 72 connected to the cross head 80 by toggle mechanism 77 by the position detector 85 provided at the output shaft 83 of the mold clamping motor 78.

Figure 8:
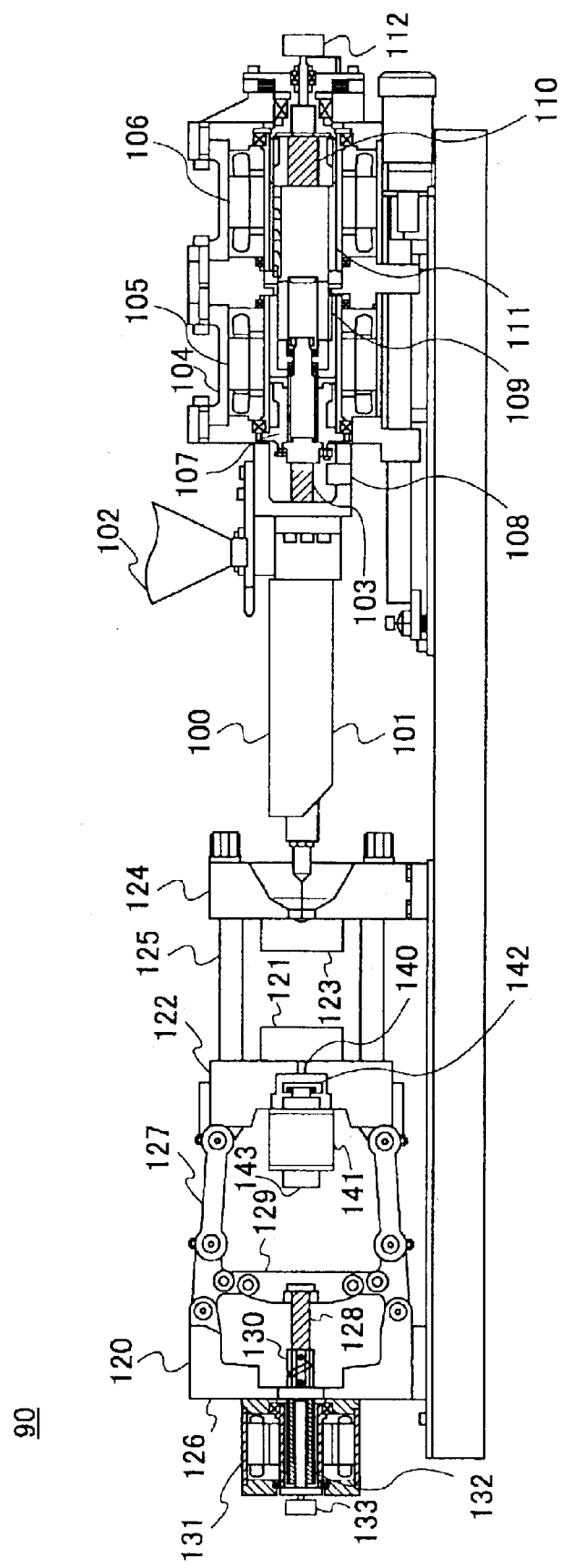
FIG. 8 is a cross sectional view showing a schematic structure of an built-in type injection molding machine 90 of a second embodiment of the present invention.

Next, an injection molding machine of a second embodiment of the present invention will be described. FIG. 8 is a cross sectional view showing a schematic structure of an built-in type injection molding machine 90 of a second embodiment of the present invention. Referring to FIG. 8, the electric injection molding machine 90 includes an injection apparatus 100 and a mold clamping apparatus 120.

The injection apparatus 100 includes a heating cylinder 101. A hopper 102 is disposed on the heating cylinder 101. The screw 103 is disposed inside the heating cylinder 101 so that the screw 103 can be rotated about an axis and can be advanced and retracted. A driving part case 104 is provided in the rear of the heating cylinder 101. The metering motor 105 is provided at a front part and the injection motor 106 is provided at a rear part, of the inside of the driving part case 104 so as to be provided in a same axis direction.

The metering motor 105 that is a driving part, rotates the screw 103 that is driven part, through a first spline 107. That is, the first spline 107 functions as a driving transmission part that transmits motive force by the metering motor 105 to the screw 103. A rotation detector 108 is provided at the first spline 107. The rotation detector 108 recognizes the number or amount of rotation of the first spline 107 so as to detect the rotation speed of the screw 103 that indicates a driven state of the screw 103.

In addition, the injection motor 106 rotates a ball screw shaft 110 through a second spline 109. The ball screw shaft 110 does a rotational-to-rectilinear motion conversion through the ball nut 111 that is slidably and matably engaged with the ball screw shaft 110. As a result of this, the screw 103 that is a driven part can be advanced and retracted. That is, the ball screw shaft 110 functions as a driving transmission part that transmits motive force by the injection motor 106 to the screw 103. The position detector 112 is provided at the rear end of the ball screw shaft 110. The position detector 112 recognizes the number or the amount of the rotation of the ball screw shaft 110 so as to detect the position of the screw 103 that indicates the driven state of the screw 103.

The mold clamping apparatus 120 includes a movable platen 122 where a movable mold 121 is attached and a stationary platen 124 where a stationary mold 123 is attached. The movable platen 122 is connected to the stationary platen 124 by tie bars 125. The movable platen 122 can slide along the tie bars 125. The mold clamping apparatus 120 also includes a toggle mechanism 127. One end part of the toggle mechanism 127 is connected to the movable platen 122 and the other end of the toggle mechanism 127 is connected to a toggle support 126. A nut 130 is provided at a center of the toggle support 126. The front end of the ball screw shaft 128 slidably and matably engaged with the nut 130 is connected to a cross head 129. The rear end of the ball screw shaft 128 is connected to a mold clamping motor 131.

In the mold clamping machine 120, for the mold clamping motor 131 that is a driving part, the rotation of the mold clamping motor 131 is converted to rectilinear motion by the spline 132. Because of this, the cross head 129 is driven by the ball screw shaft 128 and the nut 130 so that the cross head 129 can be advanced and retracted. Based on the toggle mechanism 127 being acted on, the movable platen 122 that is the driven part slides along the tie bars 125 so that the movable mold 121 is closed to, clamped to or opened from a stationary mold 123. Thus, the spline 132 functions as a driving transmission part that transmits the motive force by the mold clamping motor 131 to the cross head 129. The position detector 133 is connected to the spline 132. The position detector 133 recognizes a number of rotations and an amount of rotation of the spline 132 so as to detect a position of the cross head 129 that indicates a driven state of the cross head 129.

In addition, an ejector pin 140 for removing a molded article from the mold 121 after mold opening, is provided at a center of the movable platen 122 of the mold clamping apparatus 120. The rotation motion of the ejector motor 141 is converted to rectilinear motion by the spline, not shown in FIG. 8, in the ejector motor 141 that is a driving part. Based on the rectilinear motion, the ejector cross head 142 is driven so as to advance and retract the ejector pin 140 that is the driven part rectilinearly. The spline, not shown in FIG. 8, in the ejector motor 141, functions as a driving transmission part that transmits the motive force of the ejector motor 141 to the ejector cross head 142. The rotation detector 143 is provided at the spline. The position detector 143 recognizes a number of rotations and an amount of rotation of the spline so as to detect the position of the ejector cross head 142.

Figure 9:
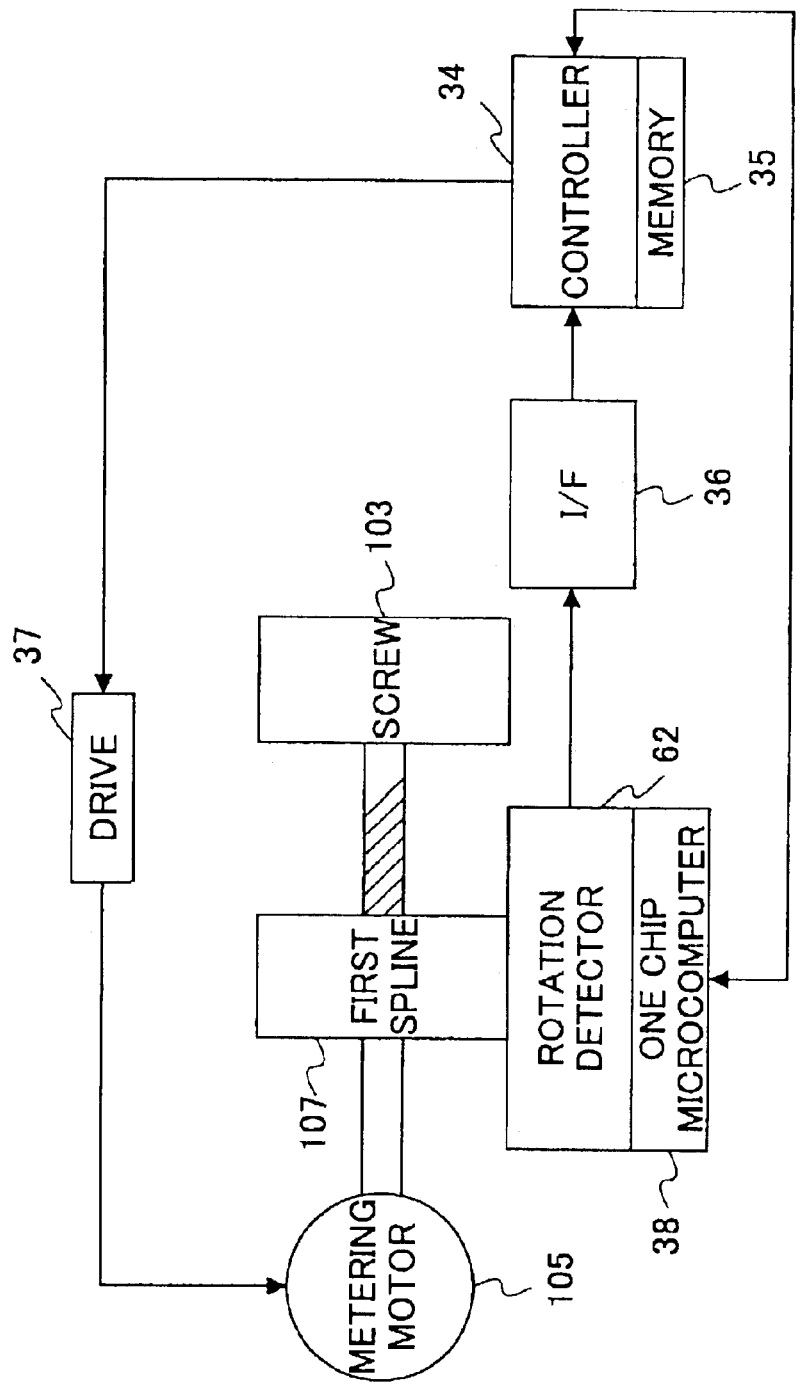
FIG. 9 is a block diagram schematically showing a feed back control system of a metering servo motor 105 of the injection molding machine 90 shown in FIG. 8 of the second embodiment of the present invention.

FIG. 9 is a block diagram schematically showing a feed back control system of a metering servo motor 105 that is one of driving parts of the injection molding machine 90 shown in FIG. 8 of the second embodiment of the present invention. This block diagram shows minimum structural elements in order to simplify the explanation of the feed back control system of this embodiment. However, an actual feed back control system has a more complex structure than the block diagram.

Referring to FIG. 9, as described above with FIG. 8, in this embodiment, the metering motor 105 that is a driving part drives the screw 103 that is a driven part. The number or amount of the rotation of the first spline 107 that is a driving transmission part is detected by the rotation detector 62.

A method of feed back control and a storing method of the original point position information, the detector information, and the molding machine information corresponding to various cases in this embodiment are same as the first embodiment and explanation thereof is omitted.

A feed back control system that the present invention is using can be applied to the injection motor 106 and the mold clamping motor 131, and the ejector motor 141, too. That is, the present invention can be applied to a feed back control based on the detection of the position of the screw 103 by the position detector 112 provided at the rear end of the ball screw shaft 110, a feed back control based on the detection of the position of the cross head 129 by the position detector 133 provided at the spline 132, and a feed back control based on the detection of the position of the ejector crosshead 142 by the position detector 143.

Figure 10:
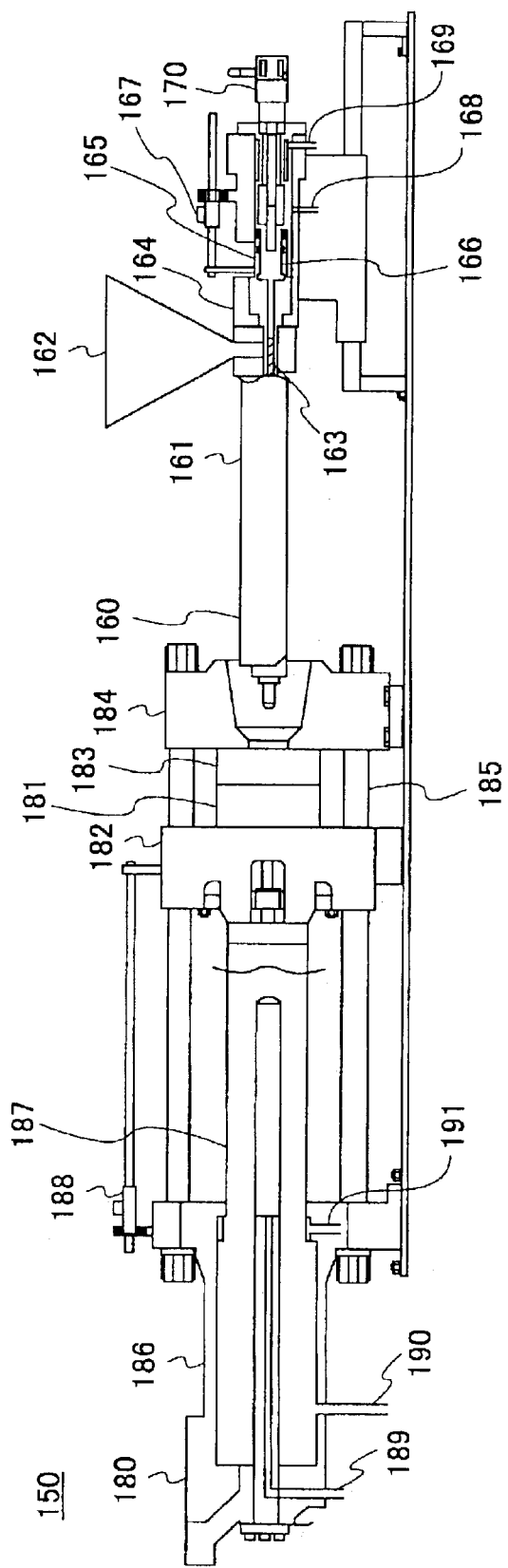
FIG. 10 is a cross sectional view showing a schematic structure of an injection molding machine 150 having a detector that detects a rectilinear motion, of a third embodiment of the present invention.

Next is an injection molding machine having a detector that detects rectilinear motion, of a third embodiment of the present invention. FIG. 10 is a cross sectional view showing a schematic structure of an injection molding machine 150 having a detector that detects rectilinear motion, of the third embodiment of the present invention. Referring to FIG. 10, a hydraulic injection molding machine 150 includes an injection apparatus 160 and the mold clamping apparatus 180.

A heating cylinder 161 is provided for the injection apparatus 160. A hopper 162 is disposed at the heating cylinder 161. A screw 163 is disposed inside the heating cylinder 161 so that the screw 163 can be rotated about an axis and can be advanced and retracted.

An injection cylinder 164 is provided at an end side of the screw 163. An injection piston 165 is disposed inside of the injection cylinder 164 so as to move in a straight line direction. The injection piston 165 that is a driving part is reciprocating-operated based on a supply of pressurized oil from oil paths 168 and 169 so that the injection piston 165 is advanced and retracted.

The screw 163 that is a driven part can be advanced and retracted by the injection piston 165 through a rod 166 provided at the rear end of the screw 163. A position detector 167 is provided at the injection piston 165. The position detector 167 detects the position of the screw 163.

At the rear side of the injection piston 165, a screw motor 170 for rotating the screw 163 is provided in the same axial direction with the screw 163, the injection cylinder 164, and the injection piston 165.

The mold clamping apparatus 180 includes a movable platen 182 having a movable mold 181 and a stationary platen 184 having a stationary mold 183. The movable platen 182 is connected to the stationary platen 184 by tie bars 185. The movable platen 182 can slide along the tie bars 185.

Furthermore, the mold clamping apparatus 180 includes a clamping cylinder 186 provided at a rear side (the left side in FIG. 10) of the movable platen 182. A clamping piston 187 is provided inside of the clamping cylinder 186 so that the clamping piston 187 can be advanced and retracted. The clamping piston 187 that is a driving part is reciprocating-operated based on a supply of pressurized oil from oil paths 189, 190 and 191 so that the movable platen 182 can be advanced and retracted. A position detector 188 is provided at the movable platen 182. The position detector 188 detects a position of the movable platen 182 that indicates a driven state of the movable platen 182.

Figure 11:
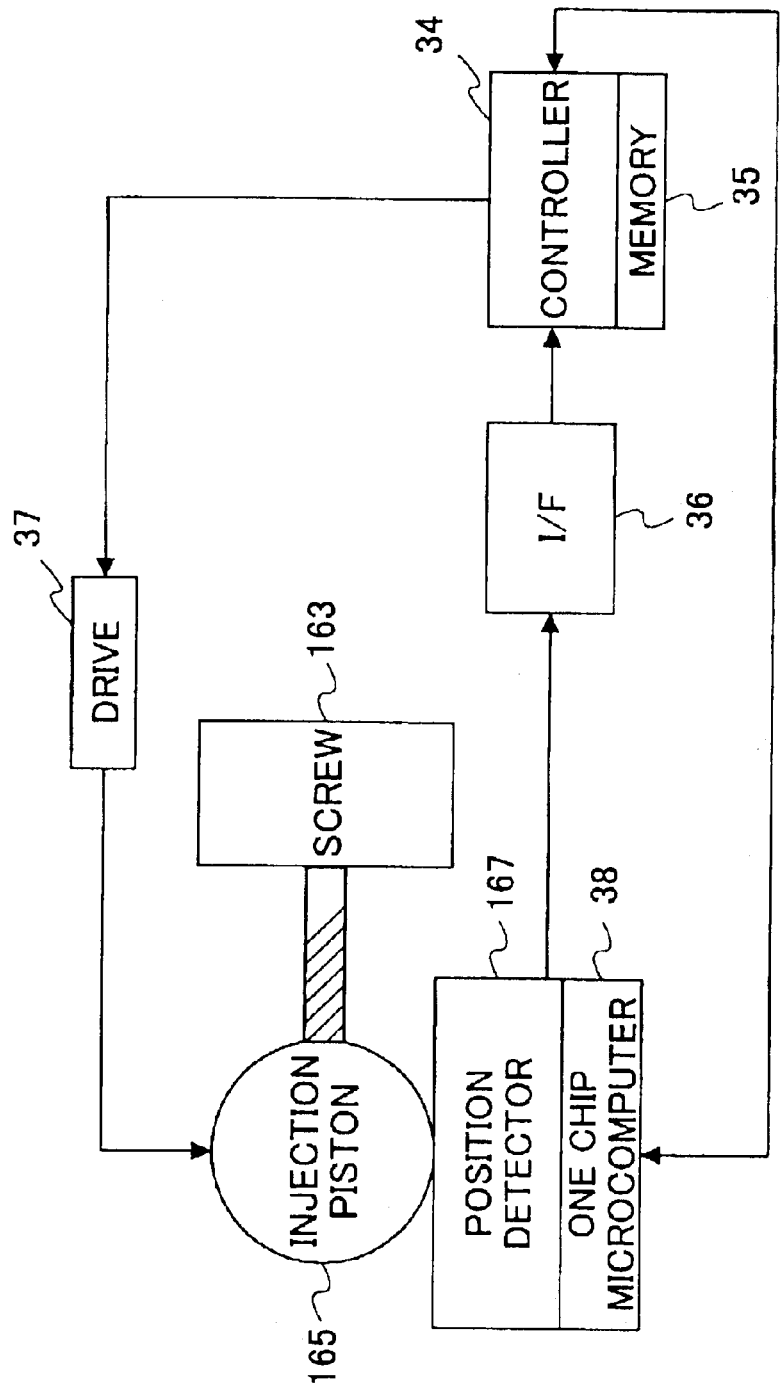
FIG. 11 is a block diagram schematically showing a feed back control system for an injection piston 165 of the injection molding machine 150 of the third embodiment of the present invention.

FIG. 11 is a block diagram schematically showing a feed back control system for an injection piston 165 of the injection molding machine 150 of the third embodiment of the present invention. This block diagram shows minimum structural elements in order to simplify the explanation of the feed back control system of this embodiment. However, an actual feed back control system has a more complex structure than the block diagram.

Referring to FIG. 11, as described above with FIG. 10, in this embodiment, the injection piston 165 that is a driving part drives the screw 163 that is a driven part. A position detector 167 that detects the position of the screw 163 is provided at the injection piston 165. A method of feed back control and a storing method of the original point position information, the detector information, and the molding machine information corresponding to various cases in this embodiment are same as the first embodiment and explanation thereof is omitted.

Figure 12:
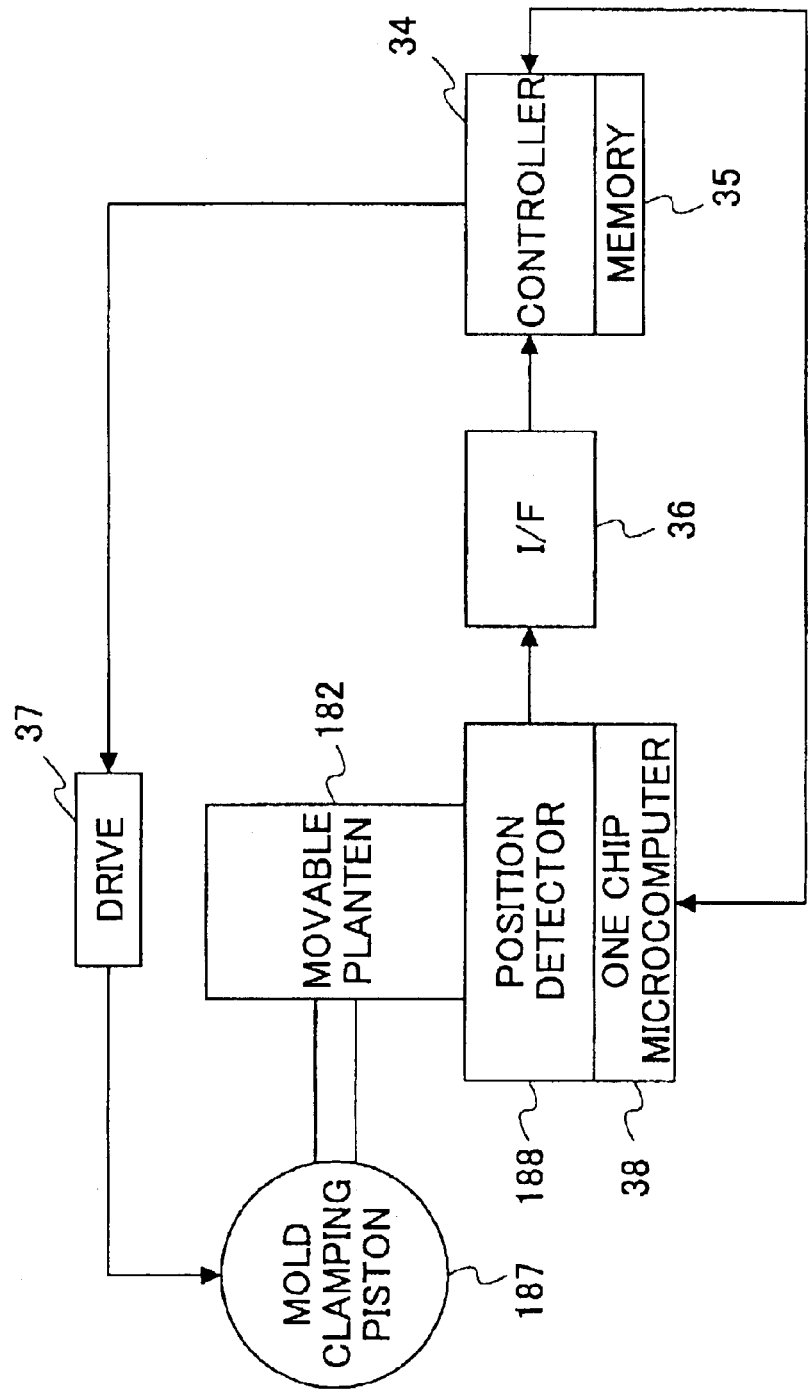
FIG. 12 is a block diagram schematically showing a feed back control system for mold clamping piston 187 of the injection molding machine 150 of the third embodiment of the present invention.

FIG. 12 is a block diagram schematically showing a feed back control system for mold clamping piston 187 of the injection molding machine 150 of the third embodiment of the present invention. This block diagram shows minimum structural elements in order to simplify the explanation of the feed back control system of this embodiment. However, an actual feed back control system has a more complex structure than the block diagram.

Referring to FIG. 12, as described above with FIG. 10, in this embodiment, the mold clamping piston 187 that is a driving part drives the movable platen 182 that is a driven part. A position detector 188 for detecting the position of the movable platen 182 is provided at the movable platen 182. A method of feed back control and a storing method of the original point position information, the detector information, and the molding machine information corresponding to various cases in this embodiment are same as the first embodiment and explanation thereof is omitted. Furthermore, although the hydraulic injection molding machine is explained as an example of the injection molding machine having a detector that detects rectilinear motion, the present invention can be applied to an injection molding machine wherein a linear motor is provided at the driving part.

The present invention is not limited to the above mentioned embodiments, but various variations and modifications may be made without departing from the scope of the present invention.

This patent application is based on Japanese priority patent applications No. 2001-155729 filed on May 24, 2001 and No. 2002-060053 filed on Mar. 6, 2002 the entire contents of which are hereby incorporated by reference.

What is claimed is:

1. An injection molding machine, comprising:
   a driving part;
   a driven part driven by the driving part; and
   a detector detecting a driven state of the driven part,
   wherein a storage medium is installed in the detector.

2. The injection molding machine as claimed in claim 1, wherein the storage medium is a one chip microcomputer.

3. The injection molding machine as claimed in claim 1, wherein detector information to distinguish the detector is stored in the storage medium.

4. The injection molding machine as claimed in claim 3, wherein original point position information of the driving part is stored in the storage medium.

5. The injection molding machine as claimed in claim 4, wherein molding machine information to distinguish the injection molding machine is stored in the storage medium.

6. The injection molding machine as claimed in claim 3, wherein the detector information includes a model, a serial number, or a version number, of the detector.

7. The injection molding machine as claimed in claim 5, wherein the molding machine information includes information with regard to a serial number of the injection molding machine and a driving apparatus.

8. The injection molding machine as claimed in claim 7, wherein the molding machine information further includes information with regard to a plasticizing capacity or mold clamping force.

9. The injection molding machine as claimed in claim 1, wherein the driving part is a motor.

10. The injection molding machine as claimed in claim 9, wherein the detector is provided at an output shaft of the motor.

11. The injection molding machine as claimed in claim 1, further comprising a driving transmission part for transmitting a motive force by the driving part to the driven part,
   wherein the detector is provided at the driving transmission part.

12. The injection molding machine as claimed in claim 1, wherein the detector is provided at the driving part.

13. The injection molding machine as claimed in claim 1, wherein the detector is provided at the driven part.

14. The injection molding machine as claimed in claim 1, wherein the driving part may be operated by supplying a hydraulic pressure.

15. The injection molding machine as claimed in claim 1, wherein the detector detects a rotation of the driven part.

16. The injection molding machine as claimed in claim 1, wherein the detector detects a position or a speed of the driven part.

17. An injection molding machine, comprising:
   a driving part;
   a driven part driven by the driving part;
   a detector detecting a driven state of the driven part and outputting a detection signal; and
   a controller receiving the detection signal so as to control a motive force by the driving part,
   wherein a storage medium is installed in the detector, a memory is stored in the controller, and common information is stored in the storage medium and the memory.

18. The injection molding machine as claimed in claim 17, wherein
   the common information is detector information for distinguishing the detector, and
   the controller compares the detector information stored in the storage medium and the detector information stored in the memory so as to report the detector information stored in the storage medium is different from the detector information stored in the memory.

19. The injection molding machine as claimed in claim 17, wherein the common information is original point position information of the driving part, and the controller compares the original point position information stored in the storage medium and the original point position information stored in the memory so as to report the original point position information stored in the storage medium is different from the original point position information stored in the memory.

20. The injection molding machine as claimed in claim 17, wherein the common information is molding machine information for distinguishing the injection molding machine, and the controller compares the molding machine information stored in the storage medium and the molding machine information stored in the memory so as to report the molding machine information stored in the storage medium is different from the molding machine information stored in the memory.

\* \* \* \* \*